Sept. 13, 1938.    R. P. GLOSE    2,129,682
COUPLER FOR LUBRICATORS
Filed July 7, 1937    2 Sheets-Sheet 1

Inventor

R. P. Glose

By *Clarence A. O'Brien*
*Hyman Berman*

Attorneys

Patented Sept. 13, 1938

2,129,682

UNITED STATES PATENT OFFICE 2,129,682

COUPLER FOR LUBRICATORS

Raymond P. Glose, Allentown, Pa.

Application July 7, 1937, Serial No. 152,440

4 Claims. (Cl. 285—161)

This invention appertains to new and useful improvements in couplers such as are used in conjunction with the grease gun for connecting the grease line with the valved fitting of the bearing.

The principal object of the present invention is to provide a coupler of the character stated which, when under pressure, will effect a seal in the coupler preventing wasteful escape of the lubricant.

Another important object of the invention is to provide automatic packing means for couplers of the character stated.

These and various other important objects and advantages of the invention will become apparent to the reader of the following specification.

Figure 1:
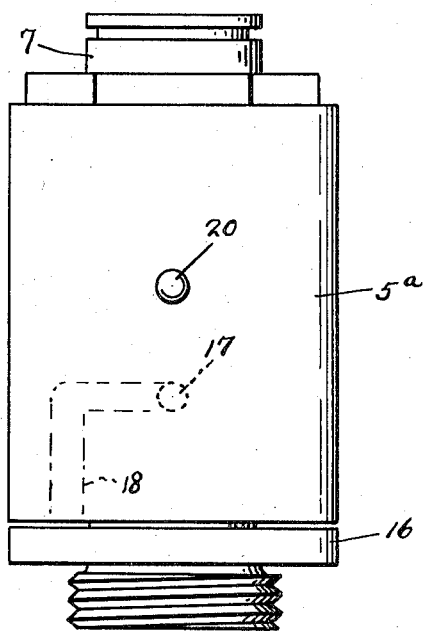
Figure 1 represents a side elevational view of the coupler shown attached to a valved fitting.
Figure 2:
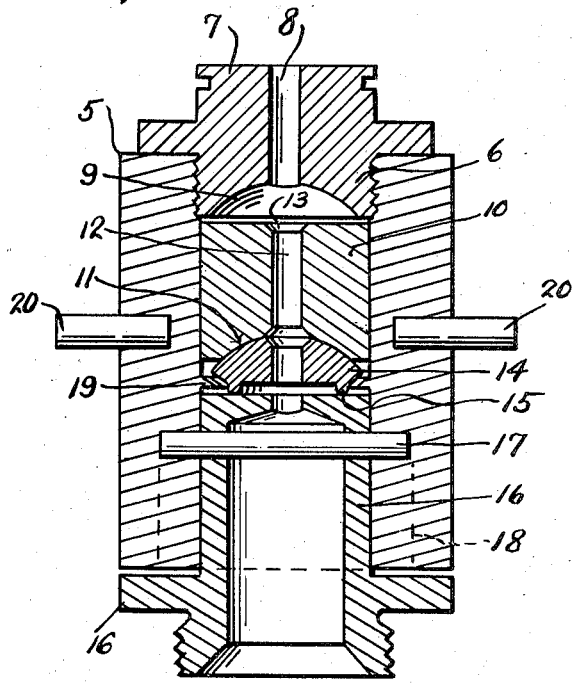
Figure 2 is a longitudinal sectional view through the structure shown in Figure 1.
Figure 3:
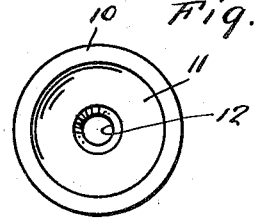
Figure 3 is an end elevational view of the free block.
Figure 4:
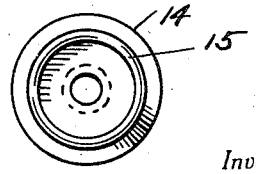
Figure 4 is a bottom plan view of the packing element.

Referring to the drawings, wherein like numerals designate like parts, it can be seen in Figure 2, that numeral 5 represents a cylindrical shell having internal threads at its upper end for receiving the threaded plug-like extension 6 of the adapter 7, which has the port 8 therethrough merging with the concavity 9 at the inner end thereof.

Numeral 10 denotes a follower freely slidable in the shell 5 and this has a concavity 11 in its lower end. A bore 12 extends through this follower 10, the upper and lower ends of this bore or port being flared as denoted by numeral 13.

The convex upper side of the disc shaped packing element 14 fits in the concavity 11 and the bottom side of this packing element 14 has the annular rib 15 thereon in opposed relation to the upper end of the conventional valved fitting 16 of a bearing. This fitting 16 has the usual cross pin 17 for riding engagement in the bayonet slot 18 in the shell 5.

It can be seen in Figure 2, that the shell 5 is provided with an internal circumferentially extending shoulder 19 upon which the packing element 14 can rest when the coupler is displaced from the fitting 16.

The coupler shell 5 is provided with laterally disposed pins 20, whereby the coupler can be rotated.

It can be seen, that when the coupler is under pressure, and attached to the fitting 16, pressure will be exerted against the follower 10, and the follower 10 in turn will force the packing element 14 against the upper end of the fitting 16 so that the ribs 15 will bear firmly against the fitting, thus preventing any grease from escaping between the packing element 14 and the fitting 16. The packing element 14 can adjust itself so that the rib 15 will engage the fitting 16 at all points of its circumference. Furthermore, the end of the port 12, as well as the upper end of the port in the element 14 are flared so that regardless of the position of the packing element, a clear passageway will be afforded at all times for the lubricant.

Figure 5:
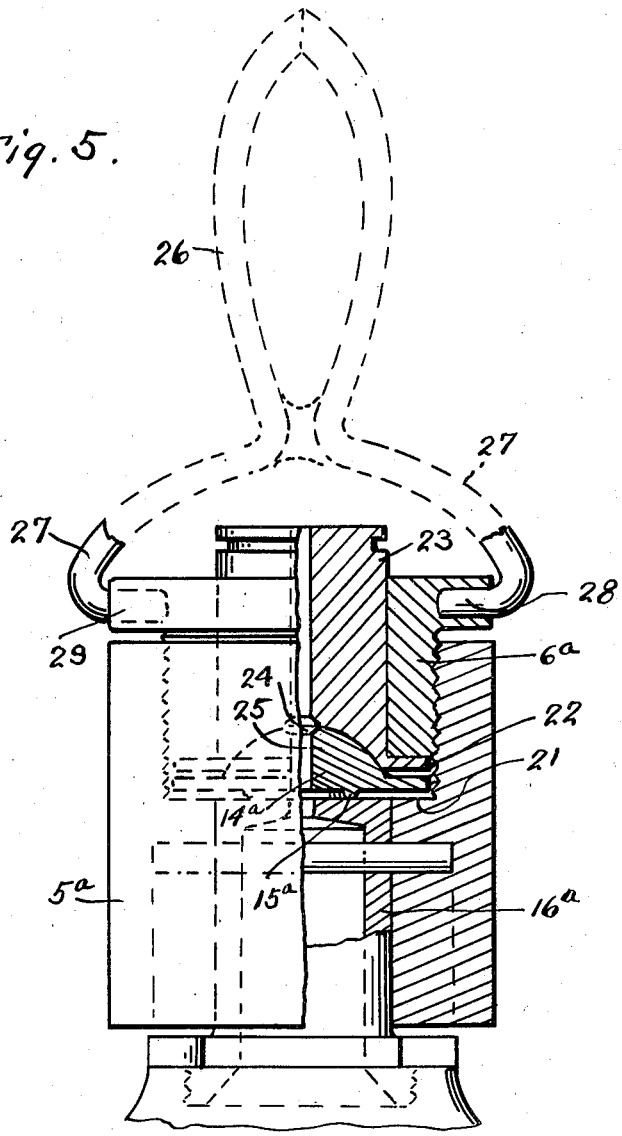
Figure 5 is a side elevational view, partly in section, and showing a modified form of coupler attached to a valved fitting.

A modified form of the invention is shown in Figure 5 wherein character reference 5a denotes the shell which is counterbored so as to define the shoulder 21.

A plug 6a is threadedly engaged into the threaded counterbore of the shell 5a and is urgable against the outstanding circumferential flange 22 of the slide body 23 through which the usual lubricant line is attachable at its outer end. This follower 23 is provided with a bore extending therethrough and merging with the concavity 24 at its inner end, which receives the convex-shaped portion 24 of the packing element 14a, this packing element 14a being provided with an opening 25 therethrough and also with an annular rib 15a for engagement with the upper end of the valved fitting 16a.

Numeral 26 represents a handle having bowed portions 27—37. These bowed portions are disposed inwardly to form pintles 28 engaged into recesses in the circumferential flange 29 of the plug 6a.

Obviously, the plug 6a can be fed inwardly against the flange 22 in which instance the follower 23 is fed inwardly in snug engagement with the packing element 14a while the packing element 14a is in turn forced against the fitting 16a to act as a seal.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. A coupler of the character described comprising a shell, a pressure responsive follower in the shell, a shoulder structure in the shell, and a universally movable packing element interposed between the follower and the said shoulder, said packing element being provided with an annular rib on the valved fitting engaging side thereof.

2. A coupler of the character described comprising a shell, a pressure responsive follower in the shell, a shoulder structure in the shell, and a universally movable packing element interposed between the follower and the said shoulder, said follower being provided with a concavity at its shoulder opposed end, said packing element being provided with a convexed side for riding engagement in the said concavity.

3. A coupler of the character described comprising a shell, a pressure responsive follower in the shell, a shoulder structure in the shell, and a universally movable packing element interposed between the follower and the said shoulder, said follower being provided with a flanged portion, a plug receivable into the said shell and against the said flanged portion for holding the said follower against the packing element.

4. A coupler of the character described comprising a shell, a pressure responsive follower in the shell, a shoulder structure in the shell, and a universally movable packing element interposed between the follower and the said shoulder, said follower being provided with a flanged portion, a plug receivable into the said shell and against the said flanged portion for holding the said follower against the packing element, and a handle on the said plug whereby the plug can be operated.

RAYMOND P. GLOSE.